March 30, 1965   R. C. McCALL ETAL   3,176,133
READING APPARATUS FOR THERMOLUMINESCENT
TYPE RADIATION DOSIMETERS
Filed Feb. 18, 1963   2 Sheets-Sheet 1

March 30, 1965 R. C. McCALL ETAL 3,176,133
READING APPARATUS FOR THERMOLUMINESCENT
TYPE RADIATION DOSIMETERS
Filed Feb. 18, 1963 2 Sheets-Sheet 2
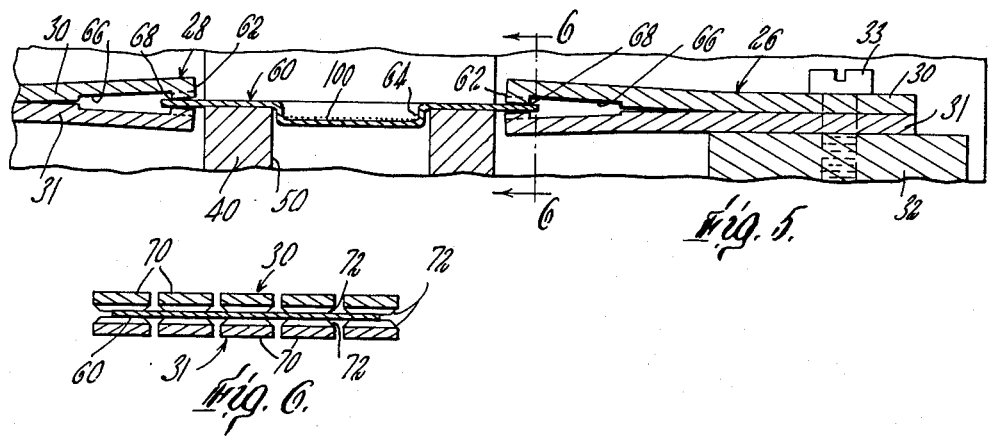
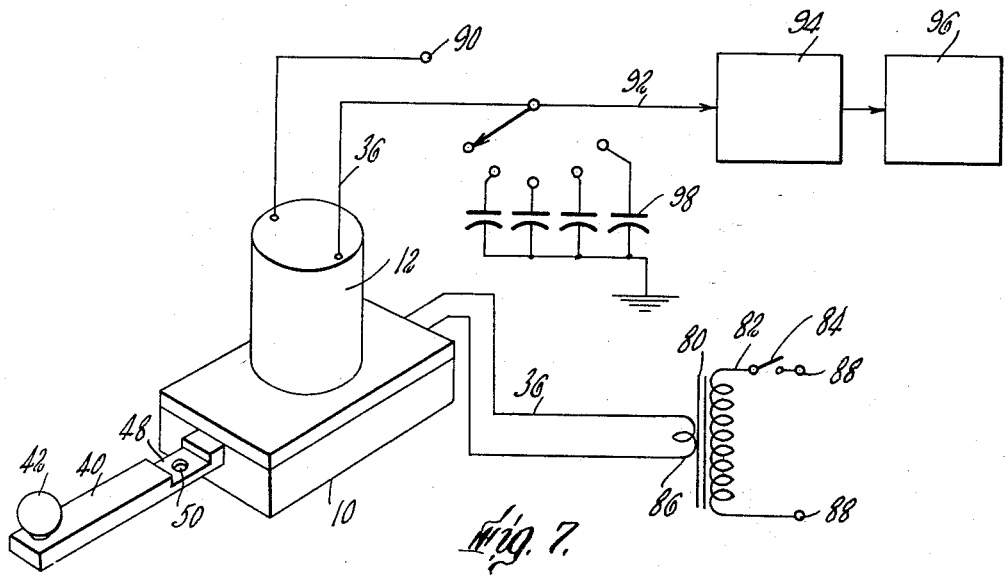

United States Patent Office 3,176,133
Patented Mar. 30, 1965

3,176,133
READING APPARATUS FOR THERMOLUMINESCENT TYPE RADIATION DOSIMETERS
Richard C. McCall, Watertown, and William H. Barr, Hingham, Mass., assignors to Controls for Radiation, Inc., Cambridge, Mass., a corporation of Massachusetts
Filed Feb. 18, 1963, Ser. No. 259,266
12 Claims. (Cl. 250—71.5)

This invention relates to nuclear radiation sensors and more particularly to novel and improved apparatus for reading radiation sensors of the thermoluminescent type.

Certain well-known crystalline substances such as quartz, when exposed to a sufficient amount of X-radiation or radioactivity, give off light when they are heated. This release of light or luminescence is caused by thermal release of electrons from positions of "metastability" and their return to the ground state. Conventional heating means are commonly employed to heat the crystalline material up to temperatures in the order of 200 to 300° C. and above, at which temperatures the material exhibits the luminescent characteristic if it has been exposed to radiation. The quantity of photon radiation released is a function of the total amount of radiation to which they have been exposed, that is the radiation dose rather than just the magnitude of radiation at a particular time. Therefore, such devices are particularly valuable in determining total exposure to nuclear radiation as an indication of the resulting harms that may occur.

Certain thermoluminescent materials, such as lithium fluoride, are particularly sensitive and release detectable photon radiation in the visible frequency spectrum in response to X-radiation dosages as low as one milliroentgen. While such dosage information is, of course, useful, the amount of light released as a result of such exposure is very small, only slightly greater than the dark current of a photomultiplier tube and completely undetectable by the naked eye. In order to achieve accurate measurements in this field it is therefore important to minimize adverse effects on the photomultiplier tube or other light sensing apparatus.

Heretofore dosimeter read out has been accomplished principally by placing the exposed thermoluminescent material on a fixed heating element and sensing the light radiation produced as the temperature of the material increases. However, such heat sources produce radiation which is detected by and affects the sensitivity of the light sensor. A second method that has been proposed employs a heating element sealed in a case with the thermoluminescent material. The heating element is energized to enable the luminescent read out operation. Such arrangements are comparatively very expensive, introduce complexities in the dosimeter unit, reduce the effective sensitivity of the dosimeter, and in some cases interfere with the intended dose measurement.

Accordingly, it is an object of this invention to provide novel and improved apparatus for reading radiation dosimeters of the thermoluminescent type.

Another object of the invention is to provide a novel and improved thermoluminescent dosimeter reader which enables use of inexpensive dosimeter configurations.

A further object of the invention is to provide novel and improved components for use in a thermoluminescent dosimeter reader.

Still another object of the invention is to provide a novel and improved thermoluminescent dosimeter reader which enables improved sensing of low level radiation doses.

In accordance with the invention there is provided an improved radiation dosimeter reader for energizing thermoluminescent materials and sensing the resulting dosage indication. A support element is provided on which the thermoluminescent material is placed in intimate contact. This support element is preferably a sheet member having a reflective surface on which the thermoluminescent material may be spread out over a relatively large area in a layer in the order of one crystal in thickness. In the preferred embodiment this support element is a stainless steel sheet which has a relatively high electrical resistance characteristic. Employed with this support element is a reading apparatus which includes a photon radiation sensor which in the preferred embodiment is a photomultiplier tube positioned within a magnetic shield inside of a substantially light tight casing. The field of view of the photomultiplier is restricted to an area substantially equal to the area of the support element over which the thermoluminescent powder is distributed on that element. The support element is a formed sheet which includes edge portions that engage electrical contacts when the support element is positioned in the field of view of the radiation sensor so that electric current may be passed via these contacts through the support element. The electric current flow heats the support element which in turn heats the layer of thermoluminescent material disposed thereon to cycle that material through the temperature range desired for read out and recording as desired. As soon as the recording operation is completed the elecrical circuit is opened, and the heated support element and thermoluminescent material are removed from the light sensing apparatus. In addition, the reading apparatus includes means whereby the support element may be positioned in and removed from the light sensor field of view with substantially no admission of external light so that the dark adapted characteristics of the photomultiplier tube are not impaired. The invention thus provides improved thermoluminescent dosimeter reading apparatus featuring increased sensitivity, ease of operation, and reduced cost.

Other objects, features and advantages of the invention will be seen as the following description of a preferred embodiment thereof progresses, in conjunction with the drawings, in which:

FIG. 5 is an enlarged sectional view taken along the line 5—5 of FIG. 1;

FIG. 6 is a sectional view taken along the line 6—6 of FIG. 4 showing the relation of one set of electrical contacts relative to the support element edge; and FIG. 7 is a diagrammatic showing of the thermoluminescent reader apparatus and associated electrical circuitry.

Figure 1:
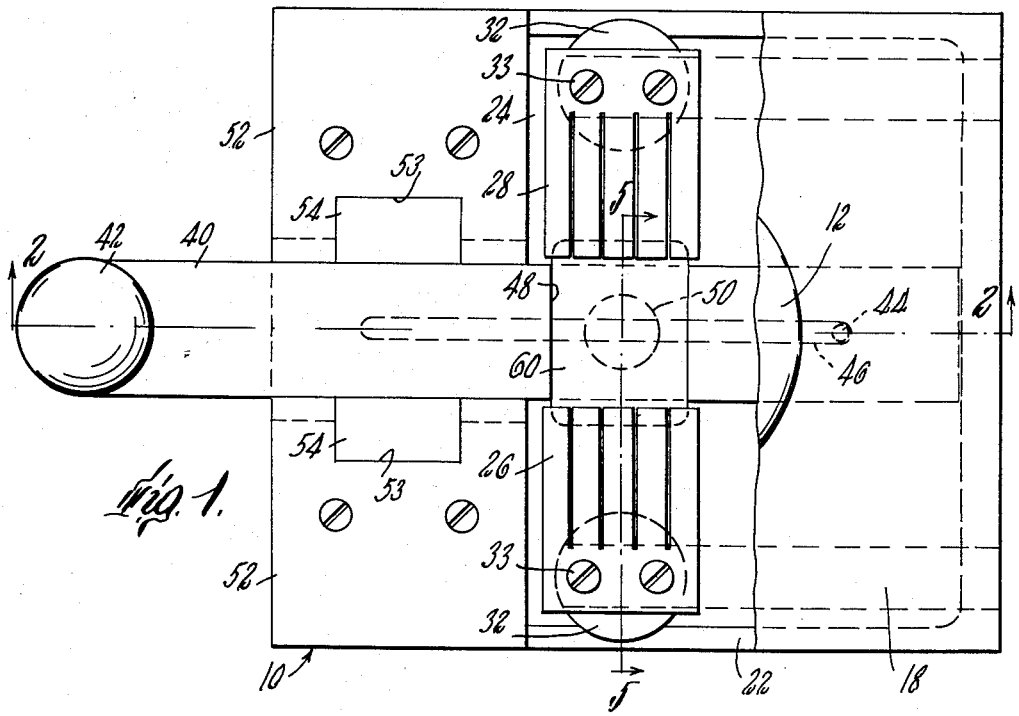
FIG. 1 is a top plan view, partially in section, of thermoluminescent dosimeter reader apparatus constructed in accordance with the invention.
Figure 2:
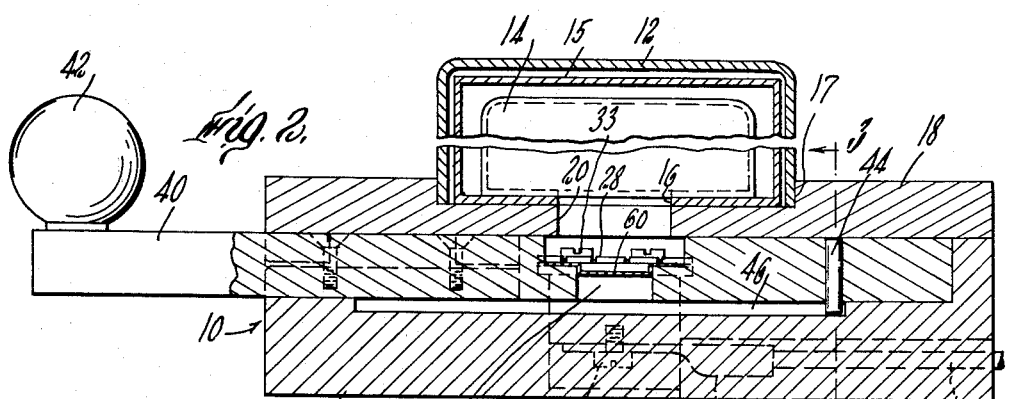
FIG. 2 is a sectional view taken along the line 2—2 of FIG. 1 of the dosimeter reader apparatus.
Figure 3:
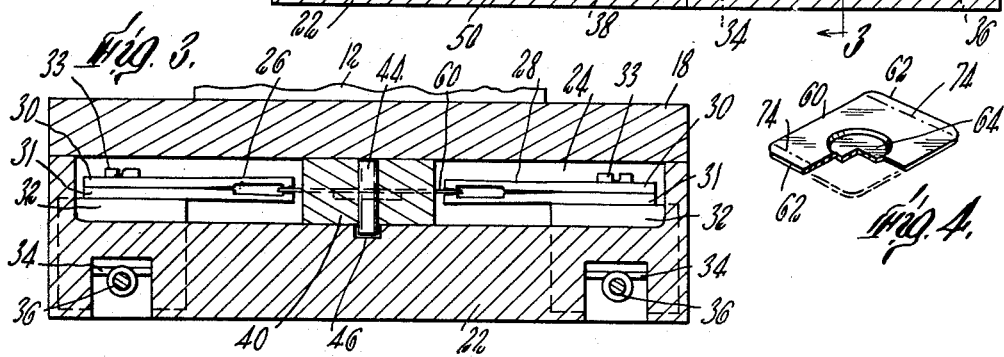
FIG. 3 is a sectional view along the line 3—3 of FIG. 2 showing the relation of the thermoluminescent material support element relative to the electrical contacts in the reader apparatus when the support element is positioned within the apparatus for a reading operation.

With reference to FIGS. 1-3, the dosimeter reader includes a base chamber 10 on which is mounted a photomultiplier tube housing 12. The photomultiplier tube 14 is mounted within a magnetic shield 15 which has a cylindrical aperture 16 in its lower wall that defines the field of view of the light sensitive elements of the photomultiplier tube. The housing 12 for the photomultiplier is disposed within the depressed cylindrical seat 17 in the top member 18 of the chamber 10 and includes a cylindrical aperture 20 aligned with the aperture 16 of the shield 15. The lower member 22 of the chamber 10 includes a recess 24 in which are disposed two electrical contact structures 26, 28. Each contact structure includes two juxtaposed contact plates 30, 31 which are secured in face to face contact to a terminal plug 32 by means of two bolts 33. The lower portion of each terminal plug, as best indicated in FIG. 3, is recessed to receive a terminal 34 that carries a conductor 36 and is secured to the terminal plug by means of a bolt 38.

A carrier element 40 having a knob 42 at its outer end is mounted for sliding movement into and out of the base chamber. The carrier element 40 includes in its lower surface a depending stud 44 towards its inner end which is normally disposed in a groove 46 in the lower chamber member 22 to control the extent of movement of the slidable carrier element 40. The carrier element also includes a support element receptacle in the form of a recess 48 and depressed cylindrical seat 50.

Toward the front of the base chamber and on member 22 are mounted two plates 52, one on either side of the carrier element 40. These plates 52 include recesses 53 in which are secured felt blocks 54 which bear against the edge surfaces of the carrier element sliding bar and also against the adjacent surfaces of the chamber members 18 and 22 to provide a light seal. Additional light seal members may be positioned in the base member 22 and also in the top member 18 if necessary to desirably further reduce the amount of light that may enter the chamber in the interior of the base structure.

Figure 4:
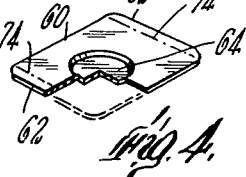
FIG. 4 is a perspective view, in partial section, of the thermoluminescent material support element.

A support element 60 for thermoluminescent material is shown in perspective view in FIG. 4. As there shown, the support element is a generally flat polished sheet which has two planar terminal portions 62 which cooperate with the contact structures 26, 28 and a centrally located cylindrical depression or cavity 64 in which thermoluminescent material is deposited. The dimensions of the depression and the size of the dosimeter are preferably correlated so that the entire amount of thermoluminescent material that has been exposed to radiation may be spread out in a layer within the depression 64 to a thickness in the order of the average dimension of the particles as indicated in FIG. 5. This support element is formed in a stamping operation from a sheet of type 302–2B stainless steel 1⅛" x 1⁷⁄₁₆" and 0.010 inch in thickness. The depression 64 is ⁹⁄₁₆" in diameter and ¹⁄₁₆" in depth.

There are two sets of contacts 26, 28 within the chamber which cooperate with the planar terminal portions 62 of the support element 60. These sets of contacts are shown in greater detail in FIGS. 5 and 6. Each set of contacts includes two flat plates 30, 31 of beryllium copper which are secured in superimposed relation to the plug by means of the screws 33. Each plate has a transversely extending recess 66 which includes an outer edge 68. Each plate is also formed with five finger portions 70 which extend perpendicular to the recess 66 and which may be individually flexed by movement of the sheet support element 60 between them so that the line edge 68 formed in each finger 70 wipingly engages the terminal portion 62 as the sheet is moved between the fingers 70 and remains in firm engagement with position therebetween. Each finger edge 72 nearer the front of the chamber 10 has a chamfer or relief to aid the entrance of the sheet 60 between the opposed aligned pair of resilient finger contacts 70. The engagement of the fingers 70 with the sheet 60 thus is along parallel lines (indicated as dashes 74 in FIG. 4) on both sides of the sheet so that a relatively low resistance contact joint is formed.

A schematic diagram of the electrical circuitry is shown in FIG. 7. Connected to the conductors 36 is a transformer 80 having a primary winding 82 connected in series with a control switch 84, and a secondary winding 86. The transformer has a step down turns ratio so that a power supply voltage of 110 volts applied at terminals 88 is stepped down to a voltage of 0.7 volt. The secondary circuit has a total resistance of about 0.01 ohm so that a current in the order of 70 amperes flows through the support element 60. As most of the voltage drop occurs across that element the power dissipated in heat by that element is in the order of 40 watts. The photomultiplier tube 14 is supplied by a negative high voltage connected to terminal 90 and the output of the photomultiplier is applied over line 92 through an electrometer tube circuit 94 to suitable indicating or recording means 96. The capacitor bank generally indicated at 98 provides an adjustment of the sensitivity of the read out from the photomultiplier tube 14.

In operation, the support element 60 carries a thin layer of thermoluminescent material 100 in the depression 64, which material has been exposed in the environment of interest. The support element is placed in the recess 48 in the carrier bar 40 with the cylindrical depression 64 in the seat 50. In this position the terminal portions 62 extend to either side of the bar 40. No light enters the chamber recess 24 due to the light seals 54 and the configuration of the bar 40. The carrier bar is then pushed in, carrying the support element 60 with it so that the terminal portions 62 slide past the light seals 54 and are driven in wiping engagement with the contact fingers 70 to complete the secondary circuit. When the support member 60 is thus positioned between the contacts in firm electrical contact, the primary circuit to the transformer 80 is energized by closing switch 84 to provide the heavy current flow in the secondary circuit. This current flowing through the stainless steel support element 60 produces substantial heat which is transferred to the layer of thermoluminescent material causing that material to luminesce if it has been exposed to radiation. As the layer of crystals is thin the photomultiplier can directly sense radiation emitted from substantially all the crystals. Also the reflective nature of the support surface directs substantially all the radiation toward the sensitive area of the photomultiplier tube. The resultant output signal is applied over line 92 through the electrometer circuitry to the recording apparatus 96.

In a conventional sensing operation utilizing a lithium[7] fluoride phosphor, for example, the crystal material is heated over a range of 200° to 300° C. and a sensing operation is performed during that heating period to sense the total amount of light emitted, this radiation being directly related to the actual radiation to which the phosphor material has been exposed. As soon as the temperature cycle is completed the circuit is deenergized and the support element 60 is removed from the chamber 10. Thus there is minimal effect on the sensitivity of the photo-multiplier tube 14 due to the presence of the source of heat for thermoluminescence. The heat source area is substantially equal to the area of thermoluminescent material and that material is disposed in intimate relation for heat transfer. The temperature to which the support must be raised to insure complete read out is therefore low. Further, substantially no light is admitted to the chamber when the support member is placed in or removed from the electrical circuit so that adverse effect on the photo-multiplier dark current is negligible.

Thus it will be seen that the invention provides improved apparatus for reading radiation dosimeters of the thermoluminescent type. While a preferred embodiment of the invention has been shown and described, various modifications thereof will be obvious to those skilled in the art, and therfore it is not intended that the invention be limited to the disclosed embodiment or to details thereof and departures may be made therefrom within the spirit and scope of the invention as defined in the claims.

What is claimed is:

1. Apparatus for reading radiation dosimeters of the thermoluminescent type comprising means defining a chamber, a light sensor disposed to sense light emitted from said chamber, two sets of electrical contacts disposed in spaced relation in said chamber, each set of contacts including a pair of juxtaposed contact elements disposed in face to face relation, means to connect each set of contacts to an electrical circuit capable of carrying a high amperage electrical current, means to introduce a resistance element adapted to carry thermoluminescent material into said chamber for connection to said sets of electrical contacts to complete an electrical circuit between said contacts comprising a carrier element having a portion adapted to be moved into and out of said chamber, said portion including means to receive in carrying relation said resistance element, said portion being movable between a first position external of said chamber and a second position at which said resistance element is disposed in firm electrical engagement with said contact sets, and means cooperating with said carrier element for preventing external light from entering said chamber.

2. Apparatus for reading radiation dosimeters of the thermoluminescent type comprising means defining a chamber, a photomultiplier tube disposed to sense light emitted from said chamber, a magnetic shield surrounding said photomultiplier element, said shield having an aperture to define a sensing area between said tube and said chamber, two sets of electrical contacts disposed in spaced relation in said chamber, each set of contacts including a pair of juxtaposed electrically conductive plates clamped together in face to face relation, each said plate being formed to provide a plurality of fingers and each finger having a contact surface element, means to connect each set of contacts to an electrical circuit capable of carrying a high amperage electrical current, means to introduce a resistance element adapted to carry thermoluminescent material into said chamber for connection to said sets of electrical contacts to complete an electrical circuit between said contacts comprising a carrier element having a portion adapted to be moved into and out of said chamber, said portion including means to receive in carrying relation said resistance element, said portion being movable between a first position external of said chamber and a second position at which said resistance element is disposed in firm electrical engagement with said contact sets, and means cooperating with said carrier element for preventing light from entering said chamber.

3. Apparatus for reading radiation dosimeters of the thermoluminescent type comprising a support element having a portion adapted to receive thermoluminescent material for disposition in a thin layer and an electrical terminal on either side of said thermoluminescent material receiving portion, said support element having a relatively high electrical resistance between said electrical terminals, a chamber, a sensor disposed in sensing relation to said chamber, means to introduce said support element into said chamber to place said support element portion in sensing position relative to said sensor, and electrical contact means within said chamber adapted to cooperate with said electrical terminals when said support element portion is in sensing position to place said support element in electrical circuit relation to a source of electrical energy for passing electrical current through said support element to heat thermoluminescent material disposed on said support element portion in a radiation dosage readout operation.

4. Apparatus for reading radiation dosimeters of the thermoluminescent type comprising a support element having a portion adapted to receive thermoluminescent material for disposition in a thin layer and an electrical terminal on either side of said thermoluminescent material receiving portion, said support element having a relatively high electrical resistance between said electrical terminals, means defining a chamber, a light sensor disposed to sense light emitted from said chamber, two sets of electrical contacts disposed in spaced relation in said chamber, each set of contacts including a pair of juxtaposed contact elements dispsed in face to face relation, means to connect each set of contacts to an electrical circuit capable of carrying a high amperage electrical current, a carrier having a support element receiving portion adapted to be moved into and out of said chamber, said receiving portion being movable between a first position external of said chamber and a second position in which the electrical terminals of said support element are adapted to be disposed in firm electrical engagement with said contact sets, and means cooperating with said carrier for preventing external light from entering said chamber.

5. Apparatus for reading radiation dosimeters of the thermoluminescent type comprising a support element having a portion adapted to receive thermoluminescent material for disposition in a thin layer and an electrical terminal on either side of said thermoluminescent material receiving portion, said support element having a relatively high electrical resistance between said electrical terminals, means defining a chamber, a photomultiplier tube disposed to sense light emitted from said chamber, a magnetic shield surrounding said photomultiplier tube, said shield having an aperture to define a sensing area between said tube and said chamber, two sets of electrical contacts disposed in spaced relation in said chamber, each set of contacts including a pair of juxtaposed electrically conductive plates clamped together in face to face relation, each said plate being formed to provide a plurality of fingers and each finger having a contact surface element, means to connect each set of contacts to an electrical circuit capable of carrying a high amperage electrical current, a carrier having a support element receiving portion adapted to be moved into and out of said chamber, said receiving portion being movable between a first position external of said chamber and a second position in which the electrical terminals of said support element are adapted to be disposed in firm electrical engagement with said contact sets, and means cooperating with said carrier for preventing external light from entering said chamber.

6. Apparatus for reading a radiation dosimeter of the thermoluminescent type comprising a planar sheet metal member of relatively high electrical resistance characteristics, said metal member having a depression centrally located therein for receiving thermoluminescent material in a thin layer and a planar electrical terminal portion on either side of said depression, the surface of said depression being finished to reflect light emitted by thermoluminescent material disposed thereon when that material is heated in a readout operation, a chamber, a sensor disposed in sensing relation to said chamber, means to introduce said metal member into said chamber to place said depression in sensing position relative to said sensor, and electrical contact means within said chamber adapted to cooperate with said electrical terminal portions when said depression is in sensing position to place said metal member in electrical circuit relation to a source of electrical energy for passing electrical current through said metal member to heat thermoluminescent material disposed on said metal member portion in a radiation dosage readout operation.

7. Apparatus for reading a radiation dosimeter of the thermoluminescent type comprising a planar sheet metal member of relatively high electrical resistance characteristics, said metal member having a depression centrally located therein for receiving thermoluminescent material in a thin layer and a planar electrical terminal portion on either side of said depression, the surface of said depression being finished to reflect light emitted by thermoluminescent material disposed thereon when that material is heated in a readout operation, means defining a chamber, a light sensor disposed to sense light emitted from said chamber, two sets of electrical contacts disposed in spaced relation in said chamber, each set of contacts including a pair of juxtaposed contact elements disposed in face to face relation, means to connect each set of contacts to an electrical circuit capable of carrying a high amperage electrical current, a carrier having a support element receiving portion adapted to be moved into and out of said chamber, said receiving portion being movable between a first position external of said chamber and a second position in which the electrical terminals of said support element are adapted to be disposed in firm electrical engagement with said contact sets, and means cooperating with said carrier for preventing external light from entering said chamber.

8. Apparatus for reading a radiation dosimeter of the thermoluminescent type comprising a planar sheet metal member of relatively high electrical resistance characteristics, said metal member having a depression centrally located therein for receiving thermoluminescent material in a thin layer and a planar electrical terminal portion on either side of said depression, the surface of said depression being finished to reflect light emitted by thermoluminescent material disposed thereon when that material is heated in a readout operation, means defining a chamber, a photomultiplier tube disposed to sense light emitted from said chamber, a magnetic shield surrounding said photomultiplier element, said shield having an aperture to define a sensing area between said tube and said chamber, two sets of electrical contacts disposed in spaced relation in said chamber, each set of contacts including a pair of juxtaposed electrically conductive plates clamped together in face to face relation, each said plate being formed to provide a plurality of fingers and each finger having a contact surface element, means to connect each set of contacts to an electrical circuit capable of carrying a high amperage electrical current, a carrier having a support element receiving portion adapted to be moved into and out of said chamber, said receiving portion being movable between a first position external of said chamber and a second position in which the electrical terminals of said support element are adapted to be disposed in firm electrical engagement with said contact sets, and means cooperating with said carrier for preventing external light from entering said chamber.

9. Apparatus for reading radiation dosimeters of the thermoluminescent type comprising a chamber, a light sensor disposed to sense light emitted from said chamber, two sets of electrical contacts disposed in spaced relation in said chamber, each set of contacts including a pair of juxtaposed electrically conductive contact elements, a low resistance connector coupling each set of contacts to an electrical circuit capable of carrying a high amperage electrical current, a support element having a relatively high electrical resistance characteristic compared to said connectors, said support element including a cavity for receiving thermoluminescent material in a thin layer and a terminal portion on either side of said cavity, means to introduce said support element into said chamber for positioning said terminal portions between said contact elements to complete an electrical circuit between said contact sets comprising a carrier element having a portion adapted to be moved into and out of said chamber, said portion including means to receive in carrying relation said support element, said portion being movable between a first position external of said chamber and a second position at which said terminal portions of said support element positioned in said carrying means are disposed in firm electrical engagement with said contact sets, and means cooperating with said carrier element for preventing external light from entering said chamber.

10. Apparatus for reading radiation dosimeters of the thermoluminescent type comprising means defining a chamber, a photomultiplier tube disposed to sense light emitted from said chamber, a magnetic shield surrounding said photomultiplier element, said shield having an aperture to define a sensing area between said tube and said chamber, two sets of electrical contacts disposed in spaced relation in said chamber, each set of contacts including a pair of juxtaposed electrically conductive plates clamped together in face to face relation, each said plate being formed to provide a plurality of fingers and each finger having a contact surface element, a low resistance connector coupling each set of contacts to an electrical circuit capable of carrying a high amperage electrical current, a support element comprising a sheet of metal having a relatively high electrical resistance characteristic compared to said connectors, said metal sheet including a cavity of receiving thermoluminescent material in a thin layer and a terminal portion on either side of said cavity, means to introduce said support element into said chamber for positioning said terminal portions between said contact elements to complete an electrical circuit between said contact sets comprising a carrier element having a portion adapted to be moved into and out of said chamber, said portion including means to receive in carrying relation said support element, said portion being movable between a first position external of said chamber and a second position at which said terminal portions of said support element positioned in said carrying means are disposed in firm electrical engagement with said contact sets, and means cooperating with said carrier element for preventing external light from entering said chamber.

11. Apparatus for reading radiation dosimeters of the thermoluminescent type comprising means defining a chamber, a photomultiplier tube disposed to sense light emitted from said chamber, a magnetic shield surrounding said photomultiplier element, said shield having an aperture to define a sensing area between said tube and said chamber, two sets of electrical contacts disposed in spaced relation in said chamber, each set of contacts including a pair of juxtaposed electrically conductive plates clamped together in face to face relation, each said plate being formed to provide a plurality of fingers and each finger having a contact surface element, a low resistance connector coupling each set of contacts to an electrical circuit capable of carrying a high amperage electrical current, a support element comprising a sheet of metal having a relatively high electrical resistance characteristic relative to said connectors, said metal sheet including a cavity for receiving thermoluminescent material in a thin layer and a terminal portion on either side of said cavity, means to introduce said support element into said chamber for positioning said terminal portions between said contact elements to complete an electrical circuit between said contact sets comprising a carrier element having a portion adapted to be moved into and out of said chamber, said portion including means to receive in carrying relation said support element, said portion being movable between a first position external of said chamber and a second position at which said terminal portions of said support element positioned in said carrying means are disposed in firm electrical engagement with said contact sets, means cooperating with said carrier element for preventing light from entering said chamber, means to energize said electrical circuit to pass electric current through said support element to heat thermoluminescent material disposed thereon, and means to record the output signal from said photomultiplier tube as a result of the heating of said thermoluminescent material to provide an indication of the radiation dosage to which said thermoluminescent material had been exposed.

12. Apparatus for reading radiation dosimeters of the thermoluminescent type comprising a chamber, a light sensor disposed to sense light emitted from said chamber, two sets of electrical contacts disposed in spaced relation in said chamber, each set of contacts including a pair of juxtaposed electrically conductive contact elements, a low resistance connector coupling each set of contacts to an electrical circuit capable of carrying a high amperage electrical current, a support element having a relatively high electrical resistance characteristic compared to said connectors, said support element including a cavity for receiving thermoluminescent material in a thin layer and a terminal position on either side of said cavity, a support element carrier disposed in sliding relation relative to said chamber and including a support element receiving portion adapted to receive said support element so that said terminal portions extend to either side of said carrier, said receiving portion being movable between a first position external of said chamber and a second position aligned with said light sensor in which second position said terminal portions are disposed in electrical circuit engagement with said contact sets to compelte an electrical circuit between said sets, and light baffling means disposed about said carrier for preventing external light from entering said chamber.

References Cited by the Examiner
UNITED STATES PATENTS

| | | | |
|---|---|---|---|
| 2,902,605 | 9/59 | Wallack | 250—71 X |
| 3,093,734 | 6/63 | Just | 250—71.5 |
| 3,115,578 | 12/63 | Schulman | 250—71 |

RALPH G. NILSON, *Primary Examiner.*

ARCHIE R. BORCHELT, *Examiner.*

UNITED STATES PATENT OFFICE
CERTIFICATE OF CORRECTION

Patent No. 3,176,133             March 30, 1965

Richard C. McCall et al.

It is hereby certified that error appears in the above numbered patent requiring correction and that the said Letters Patent should read as corrected below.

Column 2, line 27, for "elecrical" read -- electrical --; column 4, line 68, for "therfore" read -- therefore --; column 6, line 19, for "dispsed" read -- disposed --; column 8, line 66, for "of" read -- for --; column 10, line 24, for "position" read -- portion --; line 35, for "compelte" read -- complete --.

Signed and sealed this 17th day of August 1965.

(SEAL)
Attest:

ERNEST W. SWIDER
Attesting Officer

EDWARD J. BRENNER
Commissioner of Patents